United States Patent
Lin et al.

(12)

(10) Patent No.: US 6,751,781 B2
(45) Date of Patent: Jun. 15, 2004

(54) THERMAL DATA AUTOMATIC SERVICE SYSTEM

(75) Inventors: I-Liang Lin, Tainan (TW); Chun-Min Chuang, Pingtung (TW); Yung-I Yeh, Kaohsiung (TW)

(73) Assignee: Advanced Semiconductor Engineering, Inc., Kaohsiung (TW)

( * ) Notice: Subject to any disclaimer, the term of this patent is extended or adjusted under 35 U.S.C. 154(b) by 114 days.

(21) Appl. No.: 10/050,179

(22) Filed: Jan. 18, 2002

(65) Prior Publication Data

US 2003/0140321 A1 Jul. 24, 2003

(51) Int. Cl.⁷ .............................................. G06F 17/50
(52) U.S. Cl. ................................................ 716/1; 716/4
(58) Field of Search .................. 716/1, 5, 4; 703/6–12; 374/126, 44

(56) References Cited

U.S. PATENT DOCUMENTS

| | | | | |
|---|---|---|---|---|
| 5,202,843 A | * | 4/1993 | Kunimine et al. .............. 703/6 |
| 5,302,022 A | * | 4/1994 | Huang et al. .................. 374/44 |
| 5,468,994 A | * | 11/1995 | Pendse ........................ 257/693 |
| 5,604,687 A | * | 2/1997 | Hwang et al. ................. 703/12 |
| 5,713,666 A | * | 2/1998 | Seelin et al. ................. 374/126 |
| 6,269,277 B1 | * | 7/2001 | Hershenson et al. ........... 700/97 |
| 6,438,504 B2 | * | 8/2002 | Mikubo et al. .............. 702/132 |
| 6,581,186 B1 | * | 6/2003 | Frost et al. ..................... 716/1 |

OTHER PUBLICATIONS

Lasance, C.J.M., "Thermal Characterization of Electronic Parts with Compact Models: Interpretation, Application, and the Need for a Paradigm Shift" 13th Annual IEEE Semiconductor Thermal Measurement and Management Symposium, Jan. 28–30, 1997, pp. 40–48.*

* cited by examiner

Primary Examiner—Vuthe Siek
Assistant Examiner—Magid Y. Dimyan
(74) Attorney, Agent, or Firm—Troxell Law Office PLLC

(57) ABSTRACT

An internet thermal data analysis system comprises a processing unit to process an information sent by a user via a network, wherein the information comprises a package information. A job database is coupled to the processing unit to store the package information sent by the user, a thermal analysis module is coupled to the processing unit to analysis the information sent by the user. A thermal data report generator is coupled to the processing unit to generate a thermal data simulation in accordance with the information sent by the user. A forwarding module is responsive to the thermal data report generator to forward the thermal data simulation to the user.

20 Claims, 7 Drawing Sheets

| Job Data Table |||
|---|---|---|
| *Field Name* | *Field Type* | *Field Description* |
| No | numerical | the number of entrusted job from iTDAS |
| Done | character | the record whether the job had been finished |
| User | character | the user of the job |
| Date | time | the date and time of the job |
| Type | character | the package type of the job |
| Die Size L | numerical | the length of die size |
| Die Size W | numerical | the width of die size |
| Pad Size L | numerical | the length of pad size |
| Pad Size W | numerical | the width of pad size |
| Package Size L | numerical | the length of package size |
| Package Size W | numerical | the width of package size |
| TBL | numerical | the number of thermal ball along the row direction |
| TBW | numerical | the number of thermal ball along the column direction |
| BRL | numerical | the number of ring ball along the row direction |
| BRW | numerical | the number of ring ball along the column direction |
| Layer | numerical | the number of substrate layer |
| PW | numerical | the number of dissipation power |
| Check | character | whether the job is successful |
| Memo | character | the remark or memo of the job |

FIG. 2

▶ *1. The fundamental profile*

| User name | CATHY |
|---|---|
| Requested time | 2001/2/6 AM 09:49:07 |
| Completed time | 2001/2/6 AM 09:52:17 |
| Account quota | 9999 |
| Quota used | 311 |
| Account validation | 1999/11/15~2002/12/31 |

▶ *2. Simulation condition*

| Job title | ITDAS HSBGA |
|---|---|
| Package type | HSBGA |
| Ball count | 388 |
| Pitch (mm) | 1.27 |
| PKG size (mm) | 35 X 35 |
| Balls matrix | 26 X 26 |
| Ball rows depth L | 4 |
| Ball rows depth W | 4 |
| Thermal balls | 6 X 6 |
| Thermal vias | 81 |
| Pad size (mm) | 12 X 12 |
| Die size (mm) | 8 X 8 |
| Heat slug | Y |
| Substrate layers | 4L |
| PCB layers | 4L |
| Power (watt) | 3 |
| Maximum junction temperature (°C) | 125 |
| Ambient temperature (°C) | 85 |

▶ *3. Thermal data*

| Vair (m/s) | 0.0 | 1.0 | 2.0 |
|---|---|---|---|
| $\theta_{ja}$ | 13.3 | 11.5 | 10.1 |
| $\phi_{jt}$ | 2.96 | 2.95 | 2.98 |
| $\theta_{jc}$ (°C/W) | 4.2 | | |

Heat flow path

| Heat dissipated from PCB (%) | 68.6 |
|---|---|
| Heat dissipated from package top (%) | 14.1 |
| Heat dissipated from others (%) | 17.3 |

▶ *4. Solution*

Your required $\theta_{jc}$ is 13.3 (°C/W)

FIG. 4

Table 1 The maximum die size and copper pad size for each BGA size.

| Package type | Package size (mm) | Ideal max. die size (mm) |
|---|---|---|
| PBGA | 14 X 22 | 8.4 X 15.8 |
| | 23 X 23 | 13.5 X 13.5 |
| | 27 X 27 | 15.9 X 15.9 |
| | 31 X 31 | 18.9 X 18.9 |
| | 35 X 35 | 21.9 X 21.9 |
| | 37.5 X 37.5 | 25.2 X 25.2 |
| | 40 X 40 | 25.4 X 25.4 |
| HSBGA | 27 X 27 | 12.8 X 12.8 |
| | 31 X 31 | 15.3 X 15.3 |
| | 35 X 35 | 15.3 X 15.3 |
| | 37.5 X 37.5 | 17.4 X 17.4 |
| | 40 X 40 | 17.4 X 17.4 |
| LBGA | 13 X 13 | 8.3 X 8.3 |
| | 15 X 15 | 10.3 X 10.3 |
| | 17 X 17 | 12.3 X 12.3 |
| | 19 X 19 | 14.3 X 14.3 |

Job Title: [Package Size 27X27 Path 1.5]   (BACK STEP) (NEXT STEP)   o MAIN MENU

4. OTHER CONDITION

Substrate Layers [2L ▼]

PCB Layers [6L ▼]

$T_L$ (Max Junction Temperature) [125]

$T_A$ (Ambient Temperature) [55]

Power Dissipation (Watt) [2.6]

FIG. 9

Job Title: [Package Size 27X27 Path 1.5]   (BACK STEP) (NEXT STEP)   o MAIN MENU

| PKG Size (mm x mm) | 27 X 27 | Pitch (mm) | 27 X 27 |
|---|---|---|---|
| $B_L$ X $B_W$ | 15 X 15 | | |
| $BR_L$ | 5 | $BR_W$ | 5 |
| $TB_L$ | 5 | $TB_W$ | 5 |
| Die Size, $D_L$ (mm) | 8 | Die Size, $D_W$ (mm) | 8 |
| Pad Size, $DP_L$ (mm) | 9.5 | Pad Size, $DP_W$ (mm) | 9.5 |
| Substrate Layers | 4L | PCB Layers | 6L |
| $T_J$ (Mix junction Temperature) | 125 | $T_A$ (Ambient Temperature) | 55 |
| Power Dissipation (W) | 2.6 | | |

FIG. 10

THERMAL DATA AUTOMATIC SERVICE SYSTEM

FIELD OF THE INVENTION

The present invention relates to a system for automatically providing thermal data of IC package to the customer via a communication network, and more specifically, to a system for the customer to obtain a package thermal data.

BACKGROUND OF THE INVENTION

In recent years, the electronic industry is dramatically developed with a brisk step due to the improvement of the semiconductor industry and the wide spread of the computer and the communication techniques. The product is towards to the trend of lighter weight, smaller size, multi-function and faster operation speed. Under such circumstances, the packaging density of a wafer is continuously increased and the IC package is also fabricated with more input/output terminals. Based on prosperous development of knowledge and the unlimited market of the network, the network has bacome a new channel to commute and purchase goods to people. It also changes the way for people to obtain the information. The network plays an important part in our daily life. Modern network systems must allow computers to electronically communicate with each other in order to ensure shared transmission and manipulation of information. Conventional commerce involves a salesman using a telephone and a facsimile machine to negotiate a sale with a customer. In this method, two parties negotiate transaction items such as the quantity of goods for purchase, specifications of the merchandise, and payment terms. In addition to spending a significant amount of time, the conventional method of commerce is slow, time-intensive and expensive to initiate and maintain.

Rapid development of the Internet has enabled computer systems to provide an efficient, widely accessible, and secure mechanism for conducting electronic commerce. By connecting most computer systems worldwide, the network allows users to interact using various services such as electronic mail and the World Wide Web (WWW). E-mail allows individuals to communicate with each other by linking a computer system with the Internet. Designed as an easy visual interface for users, the WWW allows a server computer, called a web site, to send graphical web pages of information (web pages) to a client computer and display the web pages. These Web pages may contain control regions, such as simulated push buttons, that allow the user to acquire and display additional related web pages of information in a hypertext fashion. Each client and server has an Internet address called a Uniform Resource Locator ("URL"). The WWW uses the HTTP protocol. Currently, a Hyper Text Markup Language ("HTML") file defines a web page. A browser refers to the software on a client computer that manages the Internet connections and interprets as well as executes the commands in HTML documents. In general, web servers are stateless with respect to client transactions.

Some systems have been invented in the past to provide the service via internet including the system for matching the sellers and the buyers, the good shopping and so on. However, there is no system to provide the service of providing preliminary package thermal data service via a communication network. Thus, there is a need to have a system for the customer himself to obtain the IC package thermal data before the packaging products to be mass production.

SUMMARY OF THE INVENTION

Base on the previous discussion, the object of the present invention is to provide a system for a customer to obtain the preliminary thermal data of IC package layout via a communication network.

An internet thermal data analysis system comprises a processing unit to process information sent by a user via a network, wherein the information comprises a package information. A job database is coupled to the processing unit to store the package information sent by the user, a finite element analysis module is coupled to the processing unit to analysis the information sent by the user. A thermal data report generator is coupled to the processing unit to generate a thermal data simulation in accordance with the information sent by the user. A forwarding module is responsive to the thermal data report generator to forward the thermal data simulation to the user.

BRIEF DESCRIPTION OF THE DRAWINGS

FIG. 2 is a structure of the job database according to the present invention.

FIG. 4 is the outputs of the system according to the present invention.

FIGS. 5–10 are the user end interfaces according to the present invention.

DETAILED DESCRIPTION

The present invention discloses a system that provides the IC package thermal data to the user when some of the related parameters are inputted by the user via an internet. The user may obtain the package's thermal data via a communication network before the device to be mass production. The internet thermal data automatic service (iTDAS) receives the information from the client firstly. And then iTDAS process the requests and then informs the thermal data results to the client terminal.

Figure 1:
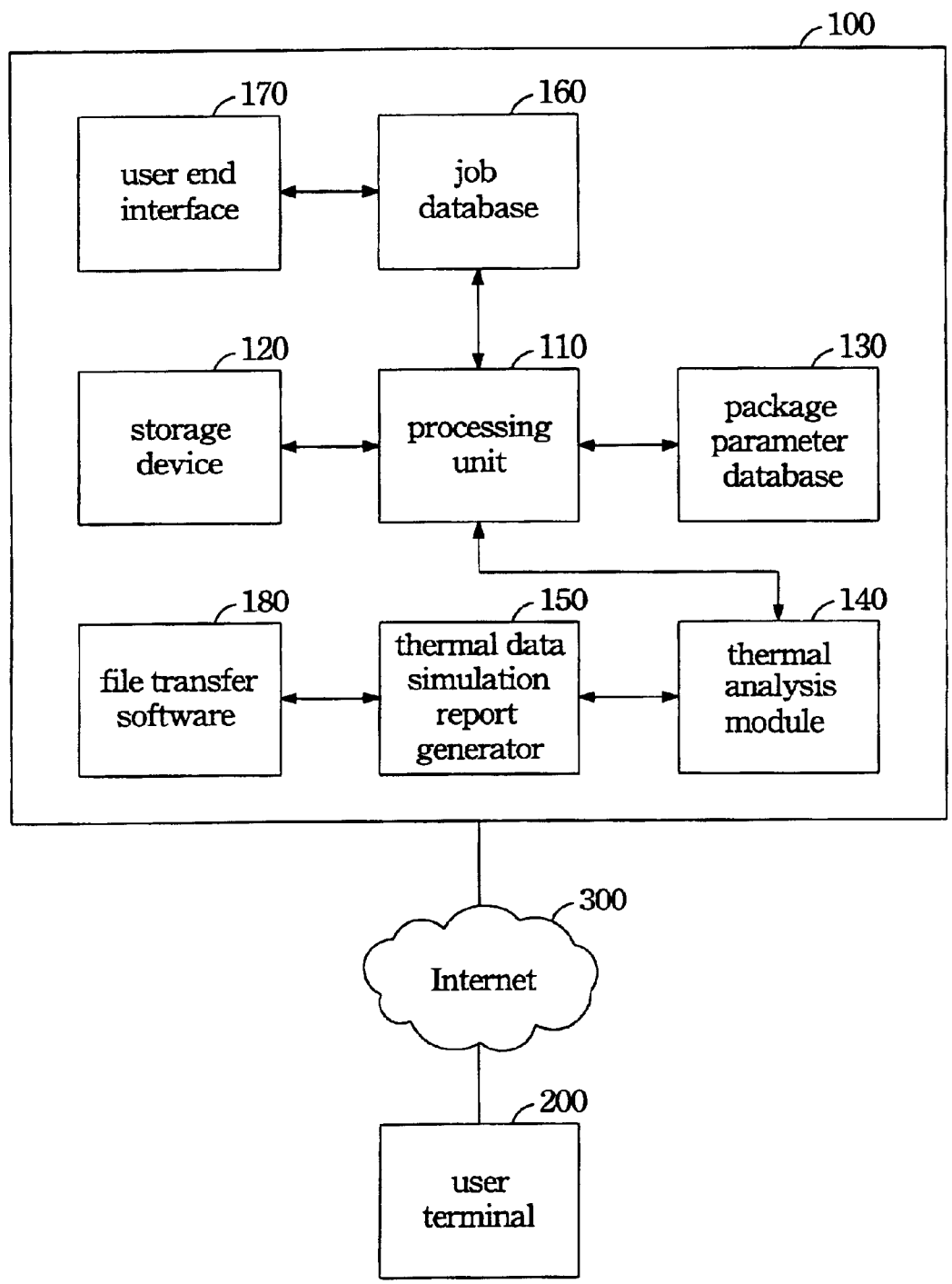
FIG. 1 illustrated a block diagram of the internet thermal data automatic service (iTDAS) according to the present invention.

With reference to the FIG. 1, there is illustrated a block diagram of the architecture of the internet thermal data automatic service (iTDAS) 100 according to the present invention. The (iTDAS) 100 includes: a user end interface 170, a job data base 160, a storage device 120, a processing unit 110, a package parameter database 130, a thermal analysis module 140, a thermal data simulation report generator 150, and a file transfer software 180. When a custom or a user has a request of about analyze the thermal data of package. He or she then sent the request from the user terminal 200 through of the internet 300 to the user end interface 170. The job data base 160 then prepared an appropriated job form for the user to input the package data from several job forms stored. The package parameter database 130 stored with IC package related information and/or thermal related data. The thermal analysis module 140 contains application software. Thus after receiving the package data from the used end interface, the process unit 110 executing the application software and using the IC package related information and/or thermal related data stored in the package parameter database 130 to simulated the thermal data of package in responsive to the package data provided by the user.

After executing the application program, provide by the thermal analysis module 140, a simulation report is then generated by the thermal data simulation report generator 150 and uses a file transfer application software 180 to transfer it to the user 200. The typical file transfer application software 180 provided in internet includes FTP (file transfer protocol) HTTP (hypertext transfer protocol) or SMTP (simple mail transfer protocol).

The iTDAS 100 is powerful for customer who needs to estimate preliminary simulation thermal data of an interested IC package. The package type that iTDAS 100 served includes BGA, QUAD, MCM(muti-chip module), CSP and Dual-in-Line family. The BGA(ball grid array) family package that includes but not limited to typical BGA, VIPER BGA, E BGA(Enhance BGA), EPBGA (Enhance Plastic ball grid array), TF BGA (Transfer Flat type Ball Grid Array) and so on. The QUAD family includes but not limited to PLCC (Plastic Leaded Chip Carrier), QFP (Quad Flat package), LQFP (Low Profile Quad Flat Package)/TQFP (Thin Quad Flat Package), the CSP includes but not limited to BCC(Bump Chip Carrier), FC-CSP (Flip Chip-chip scale package) and film BGA. The Dual-in-Line family includes but not limited to PDIP (Plastic Dual In Line Package), TSOP(thin Small Outline Package), SOP (Small Outline Package), SOJ(Small outline J-Lead Package), SSOP (Shrink Small Outline Package).

The job database 160 prepared several of job forms about package for user to key-in. FIG. 2 shows exampled parameter fields. The fields includes, for example, the number of the entrusted job from iTDAS, the user code, date, package type, die size, pad size, package size. If in the BGA case, it also includes the number of thermal ball along the row or column direction, the number of ring ball along the row or column direction. It further contains the number of the substrate layer and dissipation power. It still contains the information of about whether the job is implemented successfully and the remark or memo of the job.

Figure 3:
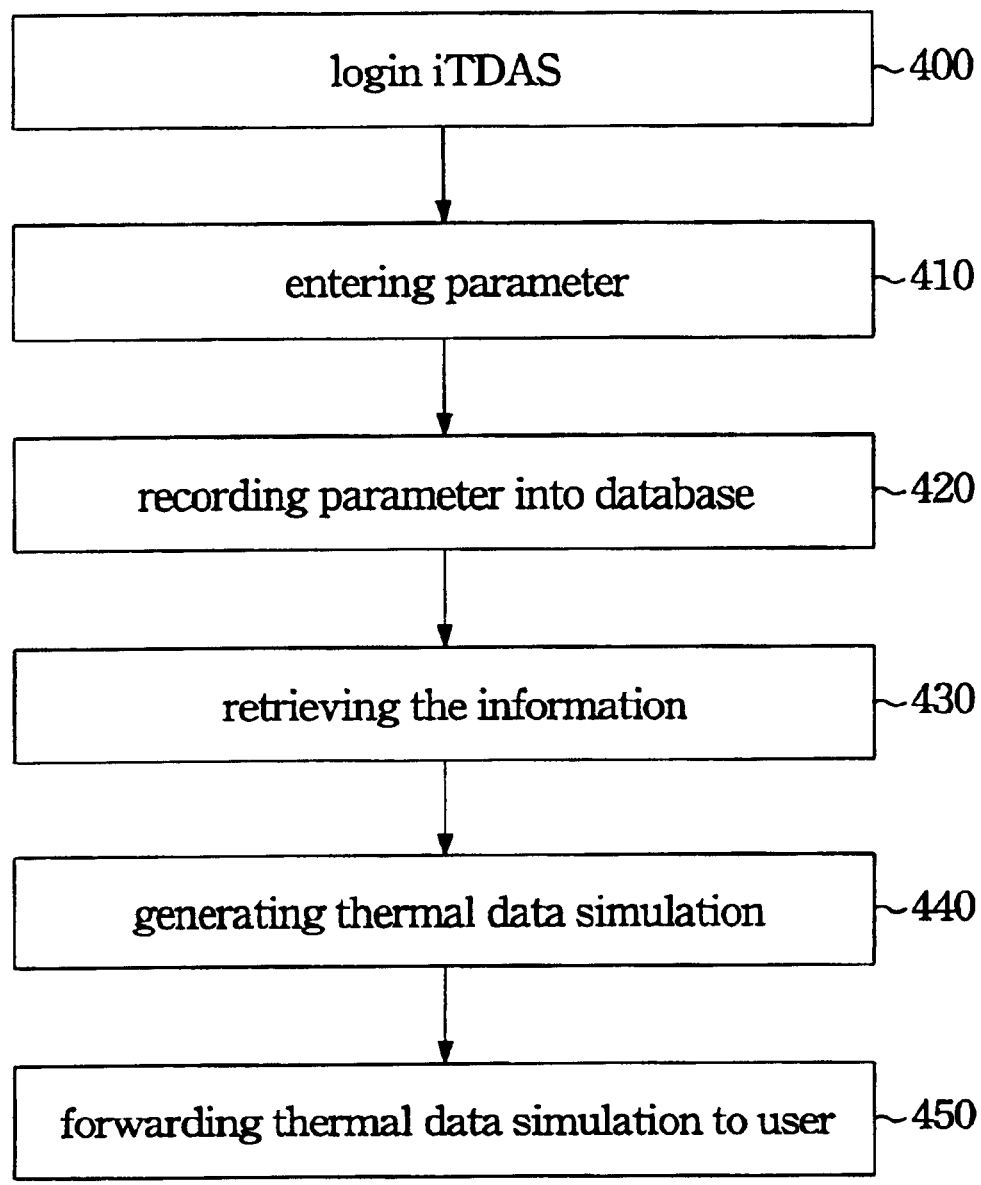
FIG. 3 is a flow chart of the iTDAS according to the present invention.
Figure 5:
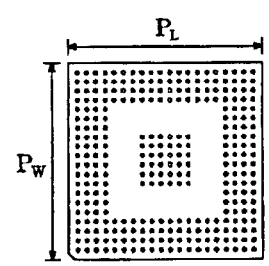
Figure 6:
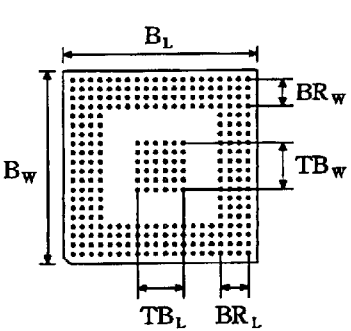
Figures 7, 8:
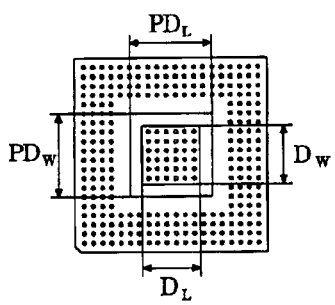

FIG. 3 is a flow chart in accordance with the present invention. The user may login the iTDAS (step 400). The user may enter data including the package parameters at steps 410. The iTDAS 100 records the information sent from the user and stores the parameter into the storage devices 120, as is listed at the step of 420 Next, step 430, the iTDAS 100 retrieves the information from the user end interface 170. The processing unit 110 actives the thermal analysis module 140 to simulate the thermal data in accordance with the parameter sent by the user. A thermal data simulation report is then generated, as the step of 440.

Afterward, in step 450, the reporter transmitter 180 next forwards the thermal data simulation report to the user through internet 300. FIG. 4 shows a report the outputs of the system 100 according to the present invention. The thermal data includes: (1) a temperature variance from a junction temperature to an ambient temperature per unit power dissipation $\Theta ja$, $\Theta ja=(Tj-Ta)/P$, wherein Tj indicates the junction temperature, Ta is the ambient temperature, and P indicates the power dissipation; (2) a temperature variance from the junction temperature to a package top center temperature $\psi jt$, $\psi jt=(Tj-Tt)/P$, wherein Tt indicates the package top center temperature; and (3) a temperature variance from the junction temperature to a case temperature per unit power dissipation $\Theta jc$, $\Theta jc=(Tj-Tc)/P$, wherein Tc indicates the case temperature. The thermal data also includes the parameter of the percentage of heat dissipated from PCB (print circuit board), from the package top and from others.

In the representative embodiment, the user end interface 170 provides several pieces of forms having blanks for user to fill in some of package relevant parameters, as shown in FIGS. 5–10. The parameters are as follows: package size and pitch, ball number, number of ring of ball, thermal ball number, in x and y direction, respectively, number of thermal via, die size, pad size, substrate layers, PCB layers, $T_L$, $T_A$, and power dissipation. FIG. 10 shows a corresponding job information list in accordance with data of user inputted.

It has to be noted that the configuration of the interface is used for samples, not for limiting the present invention.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. Thus, while the preferred embodiment of the invention has been illustrated and described, it will be appreciated that various changes can be made therein without departing from the spirit and scope of the invention.

What is claimed is:

1. An Internet thermal data analysis system comprising:
   user end interface to retrieve requests of package parameters from a far-end user requesting thermal package analysis via a network;
   a storage media;
   a job database containing several job forms and providing at least one of said job forms for the far-end user to input said package parameters;
   a thermal analysis module containing at least one application software to analyze said package parameters;
   a package parameter database having package related data stored therein;
   a process unit access package parameters, said package related data and executing said application software, so as to generate a thermal data simulation report based on said package data; and
   a file transfer software responsive to thermal data simulation report and forwarding said thermal data simulation report to said far-end user.

2. The system of claim 1, wherein said thermal data simulation report includes $\Theta ja=\{Tj-Ta\}/P$, wherein said $\Theta ja$ is a temperature variance from a junction temperature to an ambient temperature per unit power dissipation, said Tj indicates the junction temperature, said Ta indicates the ambient temperature and said P indicates the power dissipation.

3. The system of claim 1, wherein said thermal data simulation report includes $\psi jt=(Tj-Tt)/P$, wherein said $\psi jt$ is a temperature variance from a junction temperature to a package top center temperature per unit power dissipation, said Tt indicates the package top center temperature, said Tj indicates the junction temperature and said P indicates the power dissipation.

4. The system of claim 1, wherein said thermal data simulation report includes $\psi jc=(Tj-Tc)/P$, wherein said $\Theta jc$ is a temperature variance from a junction temperature to a case temperature per unit power dissipation, said Tc indicates the case temperature, said Tj indicates the junction temperature and said P indicates the power dissipation.

5. The system of claim 1, wherein said thermal data simulation report includes parameters of the percentage of heat dissipated from PCB (print circuit board) and package top.

6. The system of claim 1, wherein said thermal data simulation report includes $\Theta jc=(Tj-Tc)/P$, wherein said $\Theta jc$ is a temperature variance from a junction temperature to a case temperature per unit power dissipation, said Tc indicates the case temperature, said Tj indicates the junction temperature and said P indicates the power dissipation.

7. A method for automatically providing thermal data of a semiconductor package comprising the steps of:
inputting parameters that relates to a semiconductor package by a user;
recording said parameters in a job database;
retrieving an information from said job database;
analyzing a thermal data of a package based on said parameters sent by said user;
generating a thermal data simulation report; and
forwarding said thermal data simulation report to said user through a network.

8. The method of claim 7, wherein said thermal data simulation is analyzed by a thermal analysis module.

9. The method of claim 7, wherein said thermal data simulation report includes $\Theta ja=(Tj-Ta)/P$, said $\Theta ja$ is a temperature variance from a junction temperature to an ambient temperature per unit power dissipation, said Tj indicates the junction temperature, said Ta is the ambient temperature and said P indicates the power dissipation.

10. The method of claim 7, wherein said thermal data simulation report includes $\psi jt=(Tj-Tt)/P$, wherein said $\psi jt$ is a temperature variance from a junction temperature to a package top center temperature per unit power dissipation, said Tt indicates the package top center temperature, said Tj indicates the junction temperature and said P indicates the power dissipation.

11. The method of claim 7, wherein said thermal data simulation report includes $\Theta jc=(Tj-Tc)/P$, wherein said $\Theta jc$ is a temperature variance from a junction temperature to a case temperature per unit power dissipation, said Tc indicates the case temperature, said Tj indicates the junction temperature and said P indicates the power dissipation.

12. The method of claim 7, wherein said thermal data simulation report includes parameters of the percentage of heat dissipated from PCB (print circuit board) and package top.

13. An Internet thermal data analysis system comprising:
an user end interface to retrieve requests of package parameters from a far-end user requesting thermal package analysis via a network;
a storage media;
a job database containing several job forms and providing at least one of said job forms for the far-end user to input said package parameters;
a thermal analysis module containing at least one application software to analyze said package parameters;
a package parameter database having package related data stored therein;
a process unit access package parameters, said package related data and executing said application software, so as to generate a thermal data simulation report based on said package data, said thermal data simulation report includes parameters of the percentage of heat dissipated from PCB (print circuit board) and package top; and
a file transfer software responsive to said thermal data simulation report and forwarding said thermal data simulation to said far-end user.

14. The system of claim 13, wherein said thermal data simulation report includes $\Theta ja=\{Tj-Ta\}/P$, wherein said $\Theta ja$ is a temperature variance from a junction temperature to an ambient temperature per unit power dissipation, said Tj indicates the junction temperature, said Ta indicates the ambient temperature and said P indicates the power dissipation.

15. The system of claim 14, wherein said thermal data simulation report includes $\psi jt=(Tj-Tt)/P$, wherein said $\psi jt$ is a temperature variance from a junction temperature to a package top center temperature per unit power dissipation, said Tt indicates the package top center temperature, said Tj indicates the junction temperature and said P indicates the power dissipation.

16. A method for automatically providing thermal data of a semiconductor package comprising the steps of:
inputting parameters that relates to a semiconductor package by a user;
recording said parameters in a job database;
retrieving an information from said job database;
analyzing a thermal data of a package based on said parameters sent by said user;
generating a thermal data simulation report, said thermal data simulation report includes parameters of the percentage of heat dissipated from PCB (print circuit board) and package top; and
forwarding said thermal data simulation report to said user through a network.

17. The method of claim 16, wherein said thermal data simulation is analyzed by a thermal analysis module.

18. The method of claim 16, wherein said thermal data simulation report includes $\Theta ja=(Tj-Ta)/P$, wherein said $\Theta ja$ is a temperature variance from a junction temperature to an ambient temperature per unit power dissipation, said Tj indicates the junction temperature, said Ta is the ambient temperature and said P indicates the power dissipation.

19. The method of claim 16, wherein said thermal data simulation report includes $\psi jt=(Tj-Tt)/P$, wherein said $\psi jt$ is a temperature variance from a junction temperature to a package top center temperature per unit power dissipation, said Tt indicates the package top center temperature, said Tj indicates the junction temperature and said P indicates the power dissipation.

20. The method of claim 16, wherein said thermal data simulation report includes $\Theta jc=(Tj-Tc)/P$, wherein said $\Theta jc$ is a temperature variance from a junction temperature to a case temperature per unit power dissipation, said Tc indicates the case temperature, said Tj indicates the junction temperature and said P indicates the power dissipation.

* * * * *